(12) United States Patent
Hopp et al.

(10) Patent No.: US 9,103,698 B2
(45) Date of Patent: Aug. 11, 2015

(54) TRANSMISSION AND RECEPTION UNIT AND ROTARY ENCODER COMPRISING SAME

(71) Applicant: SICK Stegmann GmbH, Donaueschingen (DE)

(72) Inventors: David Hopp, Donaueschingen (DE); Reinhold Mutschler, Donaueschingen (DE); Stefan Basler, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 227 days.

(21) Appl. No.: 13/893,574

(22) Filed: May 14, 2013

(65) Prior Publication Data

US 2013/0306845 A1 Nov. 21, 2013

(30) Foreign Application Priority Data

May 15, 2012 (EP) .................................... 12168056

(51) Int. Cl.
  *G01D 5/347* (2006.01)
  *G01D 5/34* (2006.01)
(52) U.S. Cl.
  CPC . *G01D 5/34* (2013.01); *G01D 5/345* (2013.01)
(58) Field of Classification Search
  CPC ...................................................... G01D 5/34
  USPC ............ 250/231.1–231.18; 33/706, 707, 1 N, 33/1 PT; 341/13, 14; 356/616, 617
  See application file for complete search history.

(56) References Cited

U.S. PATENT DOCUMENTS

| | | | | |
|---|---|---|---|---|
| 3,996,476 A | * | 12/1976 | Lazzara | 250/559.4 |
| 4,968,145 A | * | 11/1990 | Takiguchi | 356/521 |
| 5,540,108 A | * | 7/1996 | Cook et al. | 73/862.041 |
| 7,777,879 B2 | * | 8/2010 | Baxter et al. | 356/364 |
| 2010/0171028 A1 | * | 7/2010 | Wong et al. | 250/230 |
| 2011/0298411 A1 | * | 12/2011 | Yoshida et al. | 318/640 |

FOREIGN PATENT DOCUMENTS

| | | |
|---|---|---|
| DE | 20102192 U1 | 6/2001 |
| EP | 2187178 A1 | 5/2010 |

OTHER PUBLICATIONS

European Search Report for European Application No. 12168056.5.

* cited by examiner

*Primary Examiner* — Renee D Chavez
(74) *Attorney, Agent, or Firm* — Nath, Goldberg & Meyer; Jerald L. Meyer; Katelyn J. Bernier

(57) ABSTRACT

The invention relates to a transmission and reception unit for the detection of an angle of rotation comprising a light transmitter (20), a light receiver (22) and a transparent support (24) which is arranged therebetween and which lies areally on the light receiver (22) and covers it, wherein the light transmitter (20) is attached to the support (24) and irradiates in a direction (28) away from the light receiver (20), wherein the light transmitter (2) is arranged centrally above the light receiver (22) such that received light (32) can be incident past the light transmitter (22) on the light receiver (32) and to a rotary encoder comprising such a unit.

11 Claims, 3 Drawing Sheets

TRANSMISSION AND RECEPTION UNIT AND ROTARY ENCODER COMPRISING SAME

Figure 1:
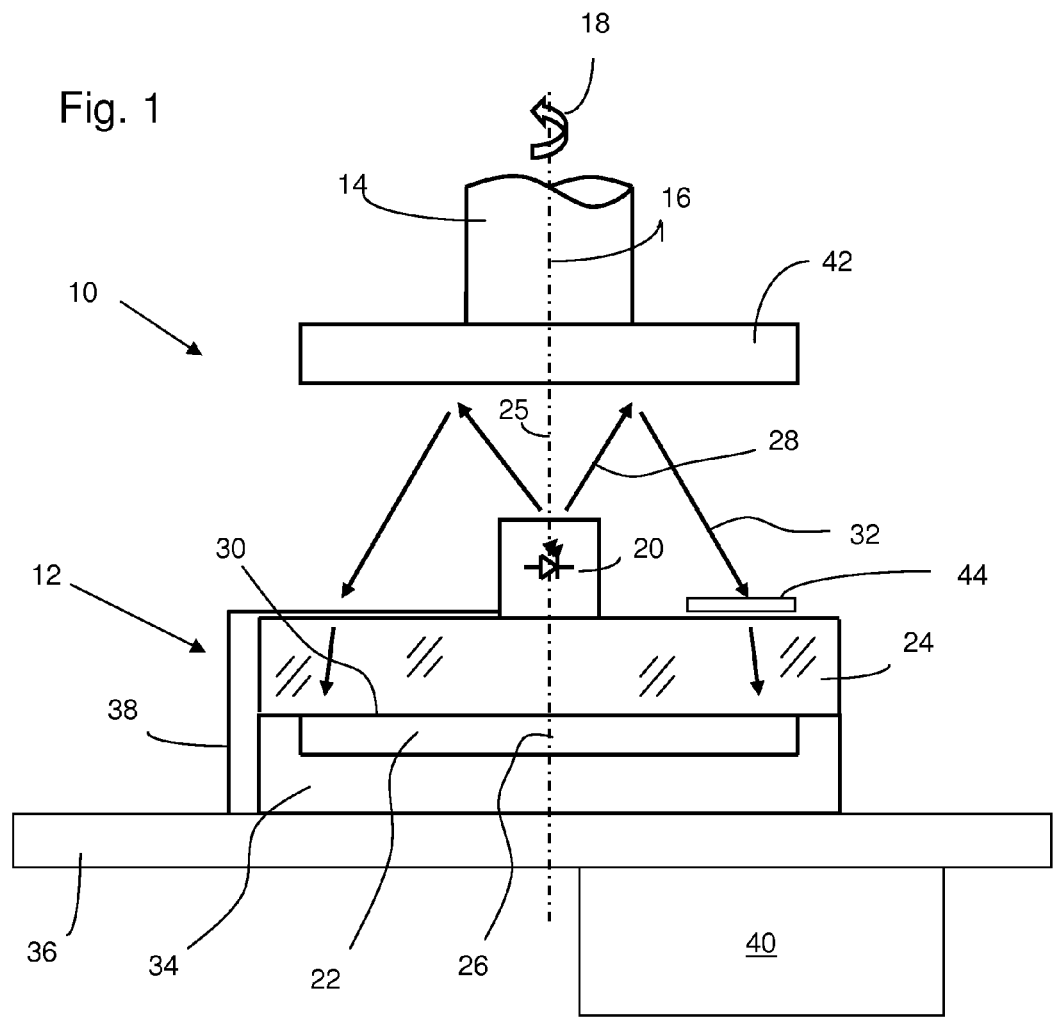

The invention relates to a transmission and reception unit for the detection of an angle of rotation as well as to a rotary encoder working therewith.

Optical principles of operation are used inter alia for detecting an angle of rotation, e.g. of a shaft. Independently of the respective optical principle, corresponding sensors comprise at least one light source, a material measure and a receiver. The material measure generates via a relative movement toward the receiver an intensity modulation of the signal on the receiver which serves as an angle signal. Two basic setup variants are used: transmittive and reflective. In particular the reflective design, in which the beam path is reflected at the material measure, has special advantages since namely then the transmitter and the receiver can be arranged at the same side, for example on the same electronic card. A real decoupling of the rotary encoder and the rotating shaft is thus possible. The rotary encoder only has to "see" the shaft.

The construction of a reflective beam path represents a challenge in dependence on the optical principle of function since the individual components, above all the transmitter and the receiver, cannot be aligned directly along an optical axis. However, a central alignment of all components lends itself to most optical principles of function, above all for reasons of symmetry.

It is the aim in the setting up of reflective optical principles of function for angle of rotation encoders to center the illumination, the material measure and the receiver on an optical axis. This requires the central placement of the light source. A central placement of the light source in turn requires a placement of the receiver off the optical axis. A symmetry only results when a plurality of receivers are positioned around the light source or when the light is deflected. For this purpose, however, beam splitters, mirror systems or similar are required which have to be adjusted. The individual components in such systems are arranged in different setup planes. The positioning or the adjustment of the optical components in a system having a plurality of setup planes is complex and cost-intensive. A deflection of the illumination beam path is equally complex and usually accompanied by a substantial loss in intensity. Furthermore, such a setup requires substantial construction space.

Starting from this, it is the object of the invention to provide a new setup concept for positioning the light source and the receiver with which the aforesaid disadvantages can be avoided.

This object is satisfied by a transmission and reception unit having the features of claim 1 and a rotary encoder for the detection of an angle of rotation having the features of claim 12.

The transmission and reception unit in accordance with the invention is provided for detecting an angle of rotation and has a light transmitter, a light receiver and a transparent support which is arranged therebetween and which lies areally on the light receiver and covers it. The light transmitter is applied to the support and irradiates in a direction away from the light receiver. The light transmitter is arrange centrally above the light receiver such that received light can be incident past the light transmitter on the light receiver.

A substantial advantage of the invention is the symmetrical set up which is thus possible so that the light transmitter and the light receiver are arranged substantially collinearly so that a compact setup is ensured without a plurality of setup planes being necessary. Only a few components are required for this.

The light transmitter and the light receiver are integrated to a unit which is simple to handle. In this respect, either the size of the light receiver is so large that the received light is incident past the light transmitter on the optical reception surface of the light receiver or a reception optics is provided so that the received light is so-to-say conducted around the light transmitter onto the receiver.

The transmission and reception unit in accordance with the invention with the receiver or the receiver chip and the integrated light transmitter can be used flexibly as an optical module and are suitable for the most varied optical principles of function. An interfering direct illumination of the receiver by the light transmitter is practically precluded.

Laterally incident scattered light which could e.g. originate from the rotary encoder housing is effectively suppressed by the reflective effect of the transparent support with oblique light incidence. Disturbing interference effects by reflection within the support can be eliminated by a suitable form of the surface of the transparent support.

The photosensitive surface is protected from environmental influences such as dust or also from direct mechanical damage by the covering of the receiver by means of the transparent support.

The optical reception surface of the light receiver is larger in a further development of the invention than the geometrical dimensions of the light transmitter. The received light can then be received by the receiver past the light transmitter without any special reception optics.

The transparent support preferably comprises glass.

In a further development of the invention, the light transmitter is bonded to the support and thus fixedly connected in a simple manner to the support and to the receiver to form an integrated unit.

The light transmitter is advantageously configured as an LED, an LED chip, a laser diode or a laser chip.

In an embodiment, further light transmitters can be arranged on the support if the application requires.

In a further development of the invention, the support has specifically shaped surfaces so that it can also take over a lens function and thus further separate optical components for the received light can be saved.

The same applies when the support is configured as an optical filter for wavelength selection and/or has diffractive structures for the diffraction, deflection or dispersion of the light and/or additionally effects a polarization of the light.

The light can be deflected up to and into the center of the receiver onto the optical axis by a suitable shape of the surface or of the structuring of the transparent support so that the reception surface of the receiver actually shaded by the light transmitter can be fully utilized.

The transmission and reception unit in accordance with the invention is advantageously used in a rotary encoder for measuring the angle of rotation of two objects rotating relative to one another.

The invention can particularly advantageously be used in angle of rotation encoders which determine the angle of rotation according to the polarization-optical principle and in which the beam path has a reflective design. For this purpose, the rotary encoder has a polarizer which rotates relative to the light source and forms a material measure. The transmitted light is reflected at the polarizer and passes through a polarizing analyzer. The receiver has at least two reception elements; the receiver is preferably configured as a light receiver array and the light receivers have an angle of rotation spacing from one another. An angle of rotation and a direction of rotation can be determined incrementally by evaluation of the signal thus obtained on the two reception elements.

To achieve an unambiguousness over 360°, the polarizer can be configured as a disk having a normal, with the normal forming an angle differing from zero with the axis of rotation.

Figure 2:
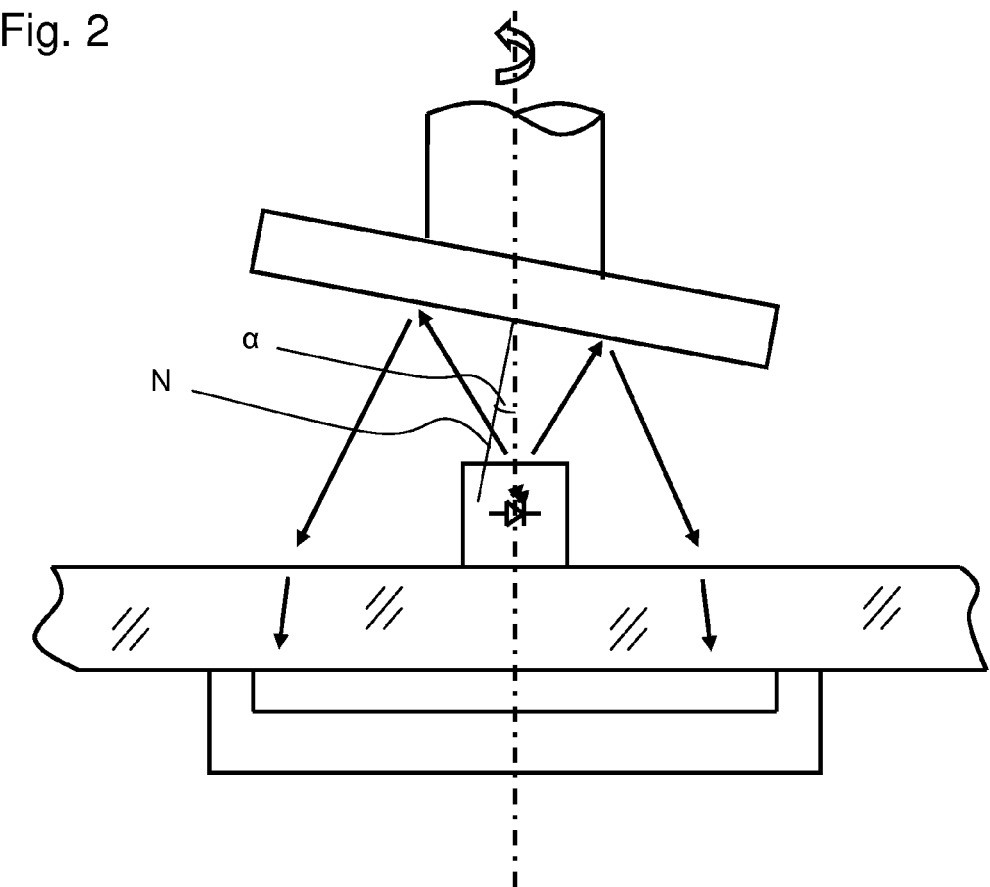

The invention will be explained in detail in the following with reference to an embodiment and to the drawing. There are shown in the drawing:

FIG. 1 a schematic representation of a rotary encoder in accordance with the invention with a transmission and reception unit in accordance with the invention;

FIG. 2 another embodiment of the rotary encoder in accordance with FIG. 1; and

Figure 3:
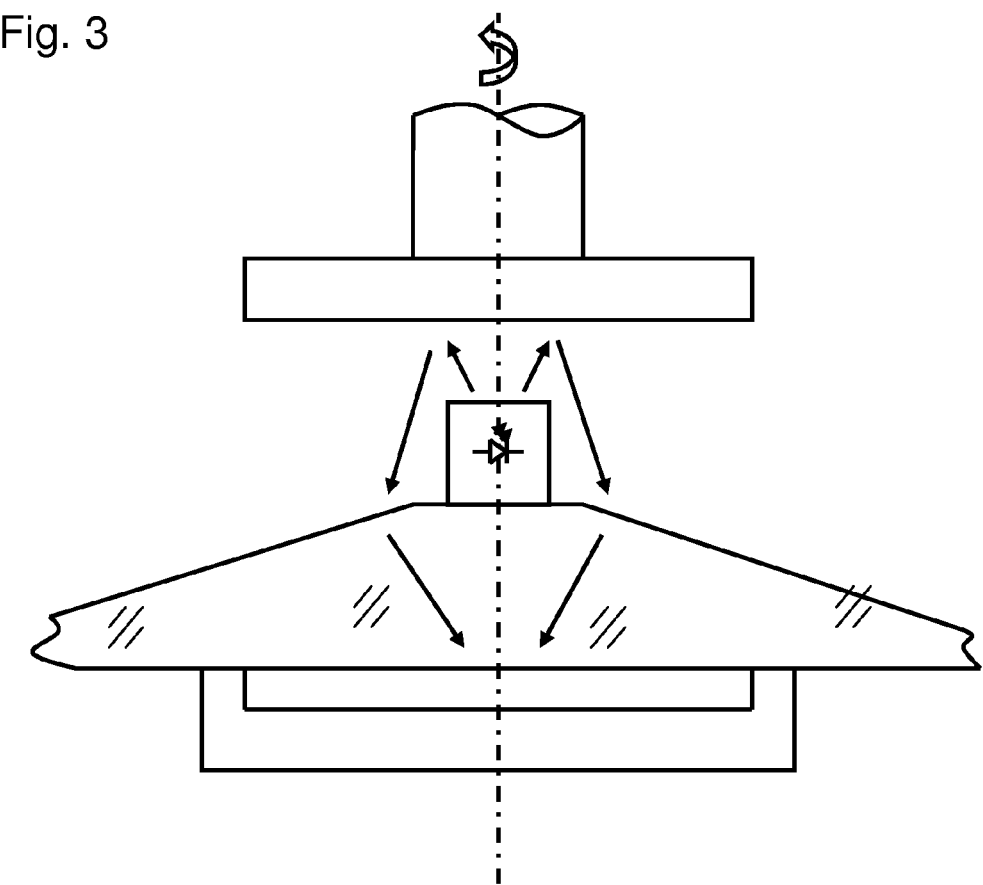

FIG. 3 a rotary encoder in accordance with FIG. 1 with another embodiment of the transmission and reception unit.

A rotary encoder 10 in accordance with the invention comprises a transmission and reception unit 12 in accordance with the invention for the detection of an angle of rotation of a shaft 14 which rotates in the direction of the arrow 18 about an axis of oration 16. The rotary encoder 1 is arranged rotationally fixed and can determine the rotation of the shaft in this embodiment in accordance with the polarization-optical principle.

The transmission and reception unit 12 has a light transmitter 20, a light receiver 22 and a support 24 arranged therebetween. The light transmitter 20 and the light receiver are arranged symmetrically, which means in this embodiment that they are symmetrical to the axis of rotation 16 and their respective optical axes 25 and 26 coincide with the axis of rotation 16.

This does not have to be the case in every application. What is important is that the light transmitter 20 irradiates in a direction which faces away from the light receiver 22, with the light transmitter 20 being arranged centrally above the light receiver 22 such that received light 32 can be incident past the light transmitter 20 on the light receiver 22.

So that the received light 32 is incident on the light receiver, either the optical reception surface 30 of the light receiver 22 is larger than the geometrical dimensions of the light transmitter 20 or a reception optics has to be provided which deflects the received light such that it is incident past the light transmitter 20 on the light receiver. Both conditions can naturally also be satisfied, i.e. a sufficiently large light reception surface plus a deflection of the received light on the shaded part of the light receiver, as will be explained further below with reference to FIG. 3.

The transmission and reception unit 12 with integrated light transmitter 20, transparent support 24 and light receiver 22 has the following design: The actual light receiver is arranged on a support substrate 34 which is itself arranged on an electronic card 36. This is preferably configured as a light receiver array having a plurality of reception elements in a CCD or CMOS construction. The light receiver 22 is in turn areally covered by the transparent support 25 which is preferably composed of glass and which can extend laterally up to the margin of the support substrate 34 or also beyond it. The light transmitter is seated centrally on the support 24 and is fixed, for example, adhesively bonded, there. Supply lines 38 to the light transmitter lead from the electronic card 36 to the light transmitter 20.

The electronic card 36 can have further electronic components 40 e.g. for controlling the light transmitter 20 and/or evaluating the signals of the light receiver 22 and/or processing of the signals and outputting output signals, e.g. in the form of angular values.

The light transmitter 20 can be an LED, an LED chip, a laser diode or a laser chip. Furthermore, a plurality of light transmitters 20 can theoretically be arranged on the support 24.

The major advantage and special sense and purpose of the transmission and reception unit 12 in accordance with the invention becomes clear on observing the rotary encoder 10 in accordance with the invention equipped therewith. The operation of a rotary encoder will be described as an example which determines the angle of rotation in accordance with the principle of polarization, that is by detection of a polarization direction.

The light 28 of the light transmitter, which is unpolarized in the case of an LED, is irradiated into a transmission cone and is incident onto a linear polarizer rotating with the shaft 14. The light 32 reflected by the polarizer 42 then has a linear polarization whose direction corresponds to the current angle of rotation of the shaft 14. The reflected light passes through an analyzer 44 which is nothing but a linear polarizer and is detected by the reception elements disposed beneath the analyzer 44. The intensity of the light measured there then has a sin2 dependency. An analog measurement is made using the same or a different analyzer at another position of the light receive which, however, has an angle of rotation spacing from the first position. This measurement at the second position delivers a second sin2 signal. Both sin2 signals together deliver an angle of rotation, on the one hand, and a direction of rotation, on the other hand, in a known manner.

In principle, such a detection of the angle of rotation of two objects rotating relative to one another about an axis of rotation is known with the help of the polarization properties of light. DE 100 05 277 A1, DE 201 02 192 U1, EP 2 187 78 A1, EP 1 507 137 A1 or U.S. Pat. No. 7,777,879 show examples for such apparatus. Due to the physical properties of the polarization, the signals dependent on the angle of rotation have at least two periods per revolution through 360° and can therefore not easily be determined absolutely. Information which would deliver an unambiguity over 360° is lacking.

To provide such information, provision is made in a further development of the invention shown in FIG. 2 that the polarized 42 is configured as a disk with an normal N. The normal N includes an angle a differing from zero with the axis of rotation 16, i.e. it is slanted. A further intensity modulation which is periodic over 360° is thereby imparted to the measured signals, whereby the information lacking for achieving the unambiguity is provided.

According to the embodiments described up to now, the support 24 is designed as a planoparallel plate. A further alternative embodiment is shown in FIG. 3 in which the support is not planoparallel, but now has directly shaped surfaces and thus e.g. satisfies a lens function or refracts the light toward the optical axis so that, for example, the actually shaded portion of the reception surface 30 can nevertheless receive light directly beneath the light transmitter 20.

Spherical lens shapes, aspheric lens shapes, Fresnel lens shapes, frustoconical shapes (FIG. 3) but also freeform shapes are suitable for an influencing of the received light beams 32. Furthermore, the transparent support 24 could be provided with diffractive structures so that a diffraction, deflection, dispersion, etc. of the light can be implemented.

Polarization properties such as are required in the above example of the rotary encoder for the analyzer function can equally be directly integrated in the support. Color filter functions, e.g. for reducing environmental light or for providing an optical bandpass filter, can also be provided directly in the transparent support 24.

The support 24 could also be produced from another material than glass. In principle the light source and the receiver do not necessarily have to be placed centrally on the optical axis.

The invention claimed is:

1. A rotary encoder for measuring an angle of rotation of two objects rotating relative to one another comprising:
   a transmission and reception unit for the detection of the angle of rotation, wherein the transmission and reception unit comprises a light transmitter (20), a light receiver (22) and a transparent support (24), which is arranged between said light transmitter and said light receiver (22), with said transparent support (24) lying areally on the light receiver (22) and covering it,
   wherein the light transmitter (20) is attached to the support (24) and irradiates in a direction (28) away from the light receiver (22),
   wherein the light transmitter (20) is arranged centrally above the light receiver (22) such that received light (32) can be incident past the light transmitter (20) on the light receiver (22),
   wherein the rotary encoder is configured as a polarization encoder (10) comprising a polarizer (42) which rotates relative to the light source (20) and at which the transmitted light (28) is reflected; and
   wherein the receiver (22) has at least two receiver elements, with a polarizing analyzer being arranged upstream thereof, and wherein the two reception elements have an angle of rotation spacing from one another.

2. A rotary encoder in accordance with claim 1, wherein the polarizer is configured as a disk with a normal and the normal forms an angle differing from zero with the axis of rotation.

3. A rotary encoder in accordance with claim 1, wherein the light transmitter (20), the light receiver (22) and the transparent support (24) are fixedly connected together and form an integrated unit and form an optical module wherein the light transmitter (20) is adhesively bonded to the support (24) and wherein the light receiver has an optical reception surface (30) and the light transmitter (20) has geometrical dimensions, with the optical reception surface being larger than said geometrical dimensions.

4. A rotary encoder in accordance with claim 1, wherein the transparent support is composed of glass.

5. A rotary encoder in accordance with claim 1, wherein the light transmitter comprises one of an LED, an LED chip, a laser diode, and a laser chip.

6. A rotary encoder in accordance with claim 1, further comprising further light transmitters, said further light transmitters being arranged on the support.

7. A rotary encoder in accordance with claim 1, wherein the support has specifically shaped surfaces and thus satisfies a lens function.

8. A rotary encoder in accordance with claim 1, wherein the support comprises an optical filter with wavelength selection.

9. A rotary encoder in accordance with claim 1, wherein the support has diffractive structures for diffraction, deflection, or dispersion of the light.

10. A rotary encoder in accordance with claim 1, wherein the support effects a polarization of the light.

11. A rotary encoder in accordance with claim 1, wherein the light receiver is configured as a receiver array, as a CCD, or in a CMOS construction.

* * * * *